US012374800B2

(12) United States Patent
Gyenes

(10) Patent No.: US 12,374,800 B2
(45) Date of Patent: Jul. 29, 2025

(54) RUGGEDIZED RAPID TUNING FREQUENCY ADJUSTABLE MOBILE HF ANTENNA WITH RE-ENTRANT CAPACITIVE HAT

(71) Applicant: Hi-Q Military Antennas-AES, LLC, Anchorage, AK (US)

(72) Inventor: Charles M Gyenes, Wildomar, CA (US)

( * ) Notice: Subject to any disclaimer, the term of this patent is extended or adjusted under 35 U.S.C. 154(b) by 144 days.

(21) Appl. No.: 18/177,157

(22) Filed: Mar. 2, 2023

(65) Prior Publication Data

US 2023/0291112 A1 Sep. 14, 2023

Related U.S. Application Data

(60) Provisional application No. 63/269,050, filed on Mar. 9, 2022.

(51) Int. Cl.

| | |
|---|---|
| ***H01Q 9/30*** | (2006.01) |
| ***H01Q 1/32*** | (2006.01) |
| ***H01Q 9/32*** | (2006.01) |

(52) U.S. Cl.

CPC ................. *H01Q 9/30* (2013.01); *H01Q 9/32* (2013.01); *H01Q 1/3258* (2013.01)

(58) Field of Classification Search

CPC ........... H01Q 1/3258; H01Q 9/30; H01Q 9/32

See application file for complete search history.

(56) References Cited

U.S. PATENT DOCUMENTS

| | | | | |
|---|---|---|---|---|
| 3,541,554 A * | 11/1970 | Shirey | H01Q 9/30 343/750 |
| 4,217,589 A | 8/1980 | Stahler | |
| 4,390,768 A | 6/1983 | Raytheon | |
| 4,847,627 A | 7/1989 | Lockheed | |
| 5,072,230 A * | 12/1991 | Taniyoshi | H01Q 1/10 343/903 |
| 6,020,854 A | 2/2000 | Rockwell | |
| 6,275,195 B1 | 8/2001 | Gyenes | |
| 6,496,154 B2 | 12/2002 | Gyenes | |
| 7,548,202 B1 | 6/2009 | Rockwell | |
| 8,897,695 B2 | 11/2014 | Wireless | |
| 9,065,178 B2 | 6/2015 | Gyenes | |
| 2014/0062814 A1* | 3/2014 | Gyenes | H01Q 21/30 343/745 |

FOREIGN PATENT DOCUMENTS

| | | |
|---|---|---|
| EP | 3086406 A1 | 10/2016 |
| JP | 2006186945 A | 7/2006 |
| JP | 2009509416 A5 | 5/2010 |

* cited by examiner

*Primary Examiner* — Dameon E Levi
*Assistant Examiner* — Amal Patel

(57) ABSTRACT

A communication antenna comprises an electrically conductive base assembly at a lower section of the antenna; a loading coil assembly, at a midsection of the antenna, and electrically connected to the base assembly; and a re-entrant capacitive hat assembly, at an upper section of the antenna, and electrically connected to the loading coil assembly, wherein the re-entrant capacitive hat assembly includes: a hat housing and a support tube longitudinally extending through the hat housing a domed shaped endcap and an insulative bushing.

9 Claims, 7 Drawing Sheets

RUGGEDIZED RAPID TUNING FREQUENCY ADJUSTABLE MOBILE HF ANTENNA WITH RE-ENTRANT CAPACITIVE HAT

CROSS REFERENCE TO RELATED APPLICATIONS

The present application claims priority to and the benefit of U.S. Provisional Patent Application No. 63/269,050, filed Mar. 9, 2022, which is incorporated herein by reference in its entirety.

BACKGROUND OF THE DISCLOSURE

The present disclosure generally relates to antennas used to transmit and receive high frequency (HF) radio signals. More particularly, the present disclosure relates to apparatus and methods for an HF monopole antenna that is attachable to a motor vehicle, vessel or aircraft and which is rapidly tunable to maximize efficiency of transmitting and receiving radio signals at different selected frequencies contained in a relatively wide band.

Radio communications between locations spaced apart at substantial distances, e.g., hundreds or thousands of miles, cannot utilize direct line-of-sight paths, because of the curvature of the earth's surface. Consequently, such communications use radio frequency signals that operate in a relatively high frequency (HF) range of about 1.6 MHz to 30 MHz. Radio signals in the HF range are used because such signals can be reflected from a high-altitude layer of the earth's atmosphere called the ionosphere. The reflectability of HF radio signals from the ionosphere enables the signals to be transmitted obliquely upwards towards the ionosphere and reflected back towards the ground beyond the visual horizon.

Radio signals that are reflected from the ionosphere and impinge on the earth's surface can also be reflected back upwardly towards the ionosphere and reflected back downwardly towards the ground again. Multiple consecutive reflections of signals between the ground and the ionosphere enable the transmission of HF signals over distances greater than could be obtained with a single reflection.

The earth's ionosphere is electrically conductive and hence, effective in reflecting radio signals by the presence of electrically charged particles in the ionosphere. The electrically charged particles consist of electrically charged gas molecules (ions) and electrons which have been stripped from neutral gas molecules (ionized) by impacting particles or energetic photons.

Because ionized particles of atmospheric gases in the ionosphere are created largely by protons or photons emitted by the sun, the concentration of ions in the ionosphere varies widely on a daily basis. Thus, the production of ionized particles overhead during daylight is greater than during nighttime. However, the re-combination rate of ions to form neutral atoms or molecules, and thus decrease the concentration of ions, depends on variables such as upper atmosphere winds. In addition to diurnal variations in ion concentrations in the ionosphere layer of the atmosphere, variations in the sun's emission of protons, which can be substantial, cause the ion concentration in the ionosphere to vary in unpredictable ways.

It is an observed and theoretically well-understood fact that the reflectivity of radio signals from the ionosphere depends both on the concentration of ions in the ionosphere, and upon the frequency of radio signals which are incident upon the ionosphere. Therefore, as is well known to HAM radio operators, as well as government agencies such as U.S. military services which communicate via HF radio signals, it is necessary to adjust the frequencies of transmitted HF signals to values which are most effectively reflected from the ionosphere at any given time, to thereby maximize the strength of radio signals received at a distant location. Frequency adjustments are also required to minimize the absorption of RF signals, because absorption properties of the ionosphere also vary during each 24-hour day.

In addition to temporal variations of the reflectivity of the ionosphere that make adjustability of HF radio signal frequencies desirable, there are spatial variations. Thus, for example, the optimum frequency for most effectively bouncing a transmitted signal from the ionosphere from a transmitter to a receiver located due North of the transmitter may differ from the optimum frequency for transmitting a signal to a receiver located West of the transmitter.

There are other reasons why it would be desirable to provide a HF communication link with frequency adjustability. For example, fixed command and control site base stations are routinely required to transmit different messages to different remote fixed or mobile receivers. Thus, by sending a sequence of signals, each at a different preselected frequency, different messages can be sent from central command and control sites to different intended recipients. Moreover, an operator at either a base station or a remote site can adjust the frequency of a transmitted radio signal and inquire of the distant recipient which frequencies currently provide the strongest received signals.

Also, it is possible to enhance the security of information impressed upon a radio frequency signal by modulating a property of the RF signal such as its amplitude or frequency, by a technique known as frequency-hopping, in which information such as a voice message or a data stream is partitioned or time-divided into a sequence of packets, each of which is sequentially transmitted on a different RF-carrier frequency.

U.S. Pat. Nos. 6,275,195 and 6,496,154 disclose a frequency adjustable, mobile, monopole antenna included a vertically disposed loading coil longitudinally aligned with a lower conductive mast section and an upwardly protruding whip section. The antenna disclosed in the above-cited patents included a commutator or coil contactor which contacted the inner surfaces of the loading coil turns. The contactor was extendible by means of a motor-driven lead screw from a lower, maximum inductance position at which the commutator contacted the lowest turns of the loading coil, where the inductance of the loading coil was a maximum, for tuning the antenna to a low frequency, and extendable to an upper limit position. In the upper limit position, an electrically conductive, shorting path was established between lower coils at the lower end of the loading coil and upper coil turns or convolutions located near the upper end of the loading coil. Thus, with the coil contactor extended to an upper position, the lower turns of the loading were shorted out. This shorting action reduced the value of the inductance in series with the mast and whip sections of the antenna, thus enabling the operating frequency of the antenna to be adjusted to higher values.

U.S. Pat. No. 9,065,178 discloses a mobile high-frequency antenna that is rapidly adjustable to minimize voltage standing wave ratio (VSWR) and hence maximize efficiency of transmitting and receiving radio signals at selectable frequencies in the approximate range of 1.6 MHz to 30 MHz. The antenna disclosed in the '178 patent includes a conductive whip mounted on the upper end of a cylindrical coil housing containing an elongated solenoidal loading coil having an upper end terminal electrically connected to the whip and a lower end terminal connected to an elongated electrically conductive mast that supports the lower end of the coil housing. A coil contactor disk attached to the upper end of a conductive metal shaft is raised or lowered by a stepper motor driven lead screw to interpose less or more coil turns and hence less or more inductance in series between the shaft and whip to thereby tune the antenna. A pair of RF de-couplers slidably contact the shaft, and electrically contact the lower end of the coil and the electrically-conductive mast that supports the coil housing, thus shorting out lower parts of the coil to suppress harmonic currents from being induced therein.

In U.S. Pat. No. 9,065,178, the coil contactor disk includes a plurality of circumferentially spaced apart, radially disposed cavities, each of which holds an electrically conductive contactor ball which is biased radially outwards by a conductive helical compression spring. The contact balls collectively form a very low electrical resistance path between the contactor disk and the inner conductive surfaces of a longitudinally disposed solenoidal loading coil wire. Moreover, the contact balls are free to rotate and thus preset minimum resistance to rapid linear motion of the contactor disk within turns of the loading coil.

According to the disclosure of the '178 patent, a minimum electrical resistance and minimum frictional resistance, tubular support of the contact disk carrier shaft is provided by a pair of longitudinally spaced apart toroidally-shaped RF de-coupler rings which bear resiliently against the outer cylindrical wall surface of the longitudinally movable carrier shaft. Each de-coupler ring is made from an elongated leaf spring which has an arcuately curved outer surface. The leaf spring is bent into a toroidal shape to position the curved surfaces of the spring sections in electrically conductive, slidable contact with the outer wall surface of the carrier shaft.

In the antenna disclosed in the '178 patent, rapid reciprocating upward and downward motion of the carrier shaft to thus rapidly position the coil contactor disk at precisely repeatable longitudinal locations within the loading coil is facilitated by a novel lead screw drive mechanism. The latter employs a permanent magnet stepper motor which has an integral shaft angle encoder that provides a feed-back signal which enables the stepper motor to be operated in a closed-loop servo motor mode. In this mode, positioning accuracy and speed are increased and motor drive power requirements are decreased, from those of a stepper motor used in a customary open-loop mode.

The present application hereby incorporates by reference the entirety of U.S. Pat. No. 9,065,178, issued Jun. 13, 2015.

A need has remained for a rapid tuning HF mobile antenna that in addition can fulfill a requirement for a physically short antenna that can meet a maximum height requirement, and that can withstand relatively severe impacts without degrading performance of the antenna and minimizing the likelihood of impact causing difficult to repair damage to the antenna. Also, a need has existed for a mobile HF antenna that can perform frequency adjustments rapidly and efficiently enough to facilitate use of the antenna in frequency hopping and auto tuning modes such as Automatic Link Establishment (ALE) and HF messaging/chat modes.

OBJECTS OF THE DISCLOSURE

An object of the present disclosure is to provide a ruggedized, rapid tuning, frequency adjustable, mobile communication antenna that enables the antenna to efficiently transmit and receive radio signals over a relatively wide range of selectable frequencies, particularly in the high frequency (HF) band between about 1.6 MHz and about 30 MHz.

Another object of the disclosure is to provide a ruggedized, rapid-tuning, frequency adjustable, mobile HF communication antenna of a linear, monopole type and that includes a vertically aligned assembly which has a lower electrically conductive mast section, an adjustable inductance loading coil midsection electrically connected to the upper end of the mast section, and an upper radiating capacitive cap section electrically connected to the upper end of the loading coil section, the loading coil section including a solenoidal coil that has an inductance which may be rapidly adjusted to precisely pre-determined values.

Another object of the disclosure is to provide a ruggedized, rapid tuning, frequency adjustable, mobile HF communication antenna that has an elongated solenoidal loading coil which has disposed through its bore a circular contactor disk that electrically contacts inner conductive surfaces of the coil wire turns, the contactor disk being supported by the upper end of a longitudinally movable tubular contactor carrier shaft that is in electrically conductive contact with the lower end lead of the coil, thus enabling the contactor carrier shaft to move the coil contactor disk to precisely determined longitudinal locations and thereby short-out lower turns of an adjustable number of lower coil turns and thereby reducing the inductance of the coil to precisely pre-determined values, the loading coil having an elongated outer cylindrical surface fixed to the inner cylindrical surface of an insulated cylindrical coil housing, the housing having disk-shaped upper and lower end caps and a centrally-located fiberglass strengthening rod fixed at the top end cap thereof and floating through the center of the bottom end cap, and disposed coaxially through the bore of the tubular contactor carrier tube.

Another object of the disclosure is to provide a ruggedized, rapid tuning, frequency adjustable, mobile HF communication antenna that has a linearly actuatable loading coil shorting disk which is made of an electrically conductive material, the disk having protruding radially inwardly from an outer longitudinally disposed circumferential rim thereof a plurality of circumferentially spaced apart, radially inwardly disposed cylindrical cavities each holding an electrically conductive contactor ball and an elongated electrically conductive compression spring which urges the ball radially outwards into contact with inner sides of loading coil turns.

Another object of the disclosure is to provide a ruggedized, rapid tuning, frequency adjustable, mobile HF communication antenna which has a solenoidal loading coil having disposed within its bore a shorting disk that is supported by an axially rearwardly disposed conductive carrier shaft which is rapidly extendable and retractable within the bore by means of a lead screw driven by a rotary stepper motor operated in a closed loop servo mode.

Another object of the disclosure is to provide a ruggedized, rapid tuning, frequency adjustable, mobile HF communications antenna that includes a lower conductive support mast, an insulated loading coil assembly supporting the upper end of the mast, and a re-entrant tubular re-entrant capacitive hat supported at the upper end of the coil assembly, the loading coil assembly having an internal loading coil having a lower end coil electrically connected to the upper end of the mast and an upper end coil electrically connected to a conductive support tube that extends coaxially through a conductive cylindrical housing shell of the re-entrant capacitive hat and is electrically connected at an upper end thereof to a conductive top end plug which is electrically conductively connected to the conductive cylindrical housing shell of the re-entrant capacitive hat.

Various other objects and advantages of the present disclosure, and its most novel features, will become apparent to those skilled in the art by perusing the accompanying specification, drawings and claims.

It is to be understood that although the disclosure herein is fully capable of achieving the objectives and providing the advantages described, the characteristics of the disclosure described herein are merely illustrative of embodiments. Accordingly, the scope of exclusive rights and privileges in the disclosure is not intended to be limited to details of the embodiments described. Equivalents, adaptations, and modifications of the disclosure reasonably inferable from the description contained herein are intended to be included within the scope of the disclosure as defined by the appended claims.

SUMMARY OF THE DISCLOSURE

In an aspect of the present disclosure, a communication antenna comprises an electrically conductive base assembly at a lower section of the antenna; a loading coil assembly, at a midsection of the antenna, and electrically connected to the base assembly; and a a re-entrant capacitive hat assembly, at an upper section of the antenna, and electrically connected to the loading coil assembly, wherein the re-entrant capacitive hat assembly includes: a hat housing; a support tube longitudinally extending through the hat housing; a domed end cap; and a non-electrically conductive insulation spacer.

In another aspect of the present disclosure, a communication antenna comprises a base assembly at a lower section of the antenna; a loading coil assembly, at a midsection of the antenna, and electrically connected to the base assembly; a re-entrant capacitive hat assembly, at an upper section of the antenna, and electrically connected to the loading coil assembly, wherein the re-entrant capacitive hat assembly includes: a hat housing; a support tube longitudinally extending through the hat housing; a domed end cap; and a non-electrically conductive insulation spacer.

In a further aspect of the present disclosure, a communication antenna comprises a base assembly; a variable inductance loading coil assembly electrically connected to the base assembly; a re-entrant capacitive hat assembly electrically connected to the loading coil assembly, wherein the re-entrant capacitive hat assembly includes: a hat housing, a support tube in the hat housing, and a bushing in the hat housing and configured to enable coupling of the support tube, to provide electrical conduction, and to receive the support tube.

Briefly stated, the present disclosure provides a ruggedized, rapid tuning, frequency adjustable mobile HF antenna with a re-entrant capacitive hat for use with radio transceivers, particularly those used in motor vehicles, vessels and aircraft. The antenna according to the present disclosure can be a monopole type, sometimes referred to as a Marconi antenna, that can have a longitudinally elongated body which can be used in a vertical orientation to transmit and receive vertically polarized radio frequency signals, such as in the approximate frequency range of 1.6 MHz to 30 MHz.

An antenna according to the present disclosure can have a novel, ruggedized construction that may reduce the likelihood of performance degradation resulting from accidental impact damages to the antenna, and can include a ruggedized, re-entrant capacitive hat that improves radiation efficiency of the antenna.

An antenna according to the present disclosure can include a lower electrically conductive hollow tubular mast section which can have at the lower end thereof a mounting bracket that is electrically isolated from the mast, and can be fastened to a support structure such as a vehicle, vessel or aircraft platform which can serve as ground plane. The mounting bracket can include a plate which has an electrical insulated eyelet bushing disposed through its thickness dimension. The eyelet bushing may have disposed through its bore a feed wire which can be electrically connected at a proximal end to the mast and which can be connectable at a distal end to the high potential RF output terminal of a radio transceiver via the isolated center conductor of a flexible coaxial cable.

An antenna according to the present disclosure may include a longitudinally elongated, cylindrically shaped, hollow loading coil tube which may be fixed to the upper end of the mast section in coaxial alignment therewith. The coil tube can be made of an electrically non-conductive material such as polycarbonate and may have formed in the inner cylindrical wall surface thereof an elongated helical groove. The groove may hold conformally therewith in convolution or turns of an electrically conductive loading coil wire which can form a uniform diameter, longitudinally elongated helically shaped solenoidal coil.

In an antenna according to the present disclosure, the lower end of the loading coil can be electrically connected to a disk-shaped conductive metal base plug which may be threaded to permit an electrically conductive contact with lower end turns of the loading coil, and attached to the coil tube. The lower end of the base plug can be electrically connected to the upper end of the mast, which supports the base plug.

In an antenna according to the present disclosure, the upper end of the coil tube may support therein a conductive cap which can be threaded into and attached to the coil tube, and which is in conductive contact with the upper end turn of the loading coil wire.

In an antenna according to the present disclosure, the upper coil tube cap may have formed in the upper side thereof a centrally located threaded bore for receiving the lower end of an elongated support tube for a re-entrant capacitive hat.

An antenna according to the present disclosure may include a re-entrant capacitive hat which can have generally the shape of an elongated cylindrical tube made of a conductive material such as aluminum. The re-entrant capacitive hat may include an upper inverted cup-shaped conductive metal re-entrant capacitive hat plug. The re-entrant capacitive hat plug can be fitted into the upper opening of the re-entrant capacitive hat tube and can be fastened in electrically conductive contact to the tube by a series of circumferentially spaced-apart, radially-dispersed screws.

In an antenna according to the present disclosure, a threaded blind bore in the lower side of the re-entrant capacitive hat upper cap plug may receive an externally-threaded upper end of a re-entrant capacitive hat support tube that extends upwardly from the upper side of the loading coil upper cap plug. An insulating Delrin spacer bushing, such as two-inches thick, may be positioned between the top of the loading coil and the bottom of the re-entrant capacitive hat tube and can have through its thickness dimension a centrally-located hole that receives therethrough the re-entrant capacitive hat support tube, and can space the lower annular end face of the re-entrant capacitive hat housing above and electrically isolated from the loading coil. The lower end of the re-entrant capacitive hat housing may also be secured to the Delrin spacer bushing by a series of radially-disposed, circumferentially spaced-apart screws.

In an antenna according to the present disclosure, the loading coil can be electrically connected in series with the upper end of the antenna mast and the lower end of the re-entrant capacitive hat support tube. The vertically arranged assembly of axially aligned components of the mast, loading coil, and re-entrant capacitive hat may comprise the radiating elements of the antenna.

As is known to those skilled in the art, adding inductance in series with the radiating element of a linear monopole antenna increases the effective electrical length of the antenna. For example, if the physical length of an antenna is 2.5 meters, which is equal to one quarter-wavelength (λ/4) of a 10-meter, 30-MHz electromagnetic radio wave, the antenna is resonantly tuned, and operates at maximum efficiency for both transmitting and receiving 30-MHz RF signals. However, the 2.5-meter length is much shorter than a quarter of a wavelength of 2-MHz signal, and thus is very inefficient in transmitting and receiving lower frequency signals, e.g., 2-MHz signals. This is because at lower frequencies the physical length of the antenna is substantially shorter than a quarter of a wavelength (λ/4), causing the antenna impedance to have a relatively large negative, i.e., capacitive, reactance component.

Inserting a loading coil in series with a monopole antenna that is shorter than λ/4 can introduce a positive reactance produced by the inductance of the loading coil that opposes the negative capacitive reactance of the radiating element of the antenna, thus decreasing the magnitude of the reactive component of the antenna input impedance and thereby increasing the effective electrical length of the antenna to a value greater than its physical length.

By a suitable choice of the value of the inductance of the loading coil, the effective length of a monopole antenna can be increased to a value much closer to one-quarter of a wavelength (λ/4) of lower frequency signals, and thus adjust the input impedance of the antenna to a value which more closely matches the output impedance of a radio transceiver connected to the antenna. Such impedance matching minimizes reflections of signals conducted between the transceiver and antenna, and thereby increases efficiency of transmitting and receiving lower frequency signals.

According to the present disclosure, a re-entrant capacitive hat, instead of a whip antenna, can add capacitance in parallel with the virtual capacitance of a radiating vertical monopole that results from the monopole being shorter than one-quarter of a wavelength (λ/4) of the radio signal being transmitted or received. The increased value of capacitance decreases the effective capacitive reactance at any frequency. Accordingly, the value of inductance required to produce a positive reactance equal and opposite to the effective, capacitive reactance of the short antenna can be reduced. Thus, according to the present disclosure, the loading coil may have a lower inductance, and accordingly fewer wire turns and less ohmic resistance, thereby decreasing $I^2R$ losses and thus improving radiation efficiency of the antenna. Importantly, the antenna with re-entrant capacitive hat according to the present disclosure can be tuned to resonate at lower frequencies while still being shorter than λ/4.

DESCRIPTION OF THE DISCLOSURE

FIGS. 1-8 illustrate the construction and functions of an embodiment of a ruggedized rapid tuning adjustable frequency capable mobile HF antenna with re-entrant capacitive hat in support of frequency hopping and auto tuning modes such as Automatic Link Establishment (ALE) and HF messaging/chat modes according to the present disclosure. Certain aspects of the construction and functions of the ruggedized antenna according to the present disclosure can be the same or similar to corresponding elements of the antenna disclosed in U.S. Pat. No. 9,065,178. Therefore, the ensuing description hereby incorporates by reference the entire disclosure of the '178 patent, and for the sake of brevity and succinctness, may discuss primarily those features of the construction and functions of the presently disclosed ruggedized antenna that distinguish it from the antenna disclosed in the '178 patent.

Figure 1:
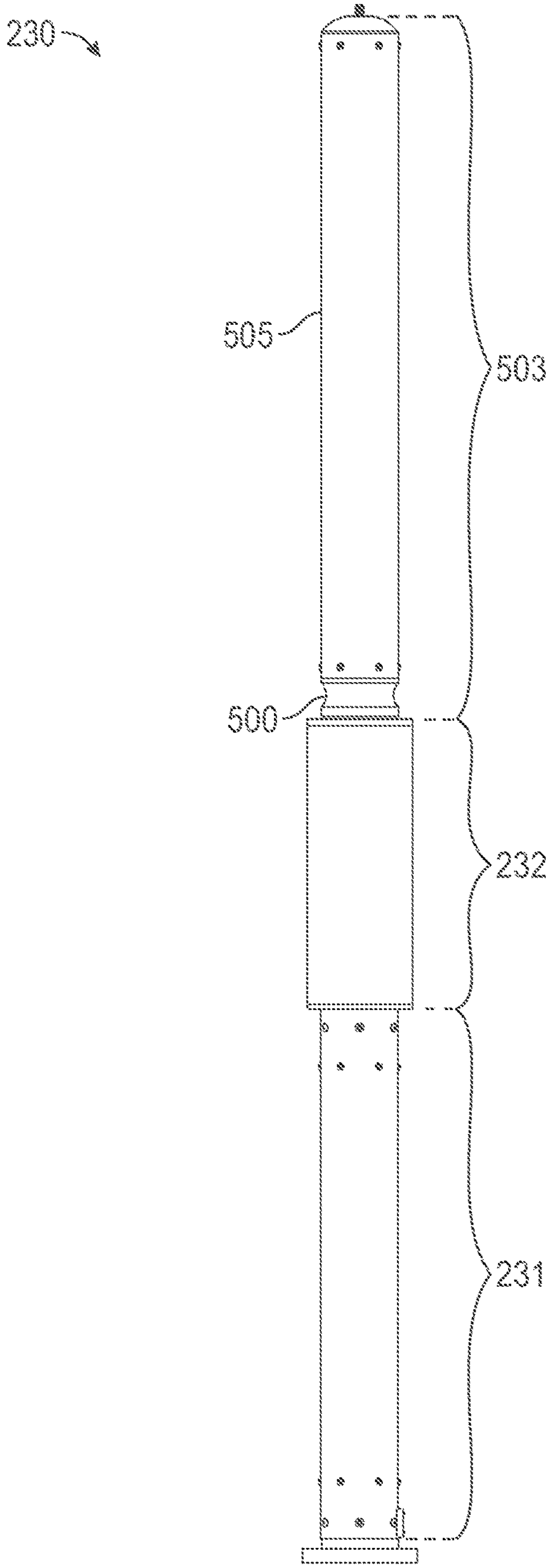
FIG. 1 is an elevated plan view of an exterior of an antenna according to an exemplary aspect of the present disclosure.
Figure 2:
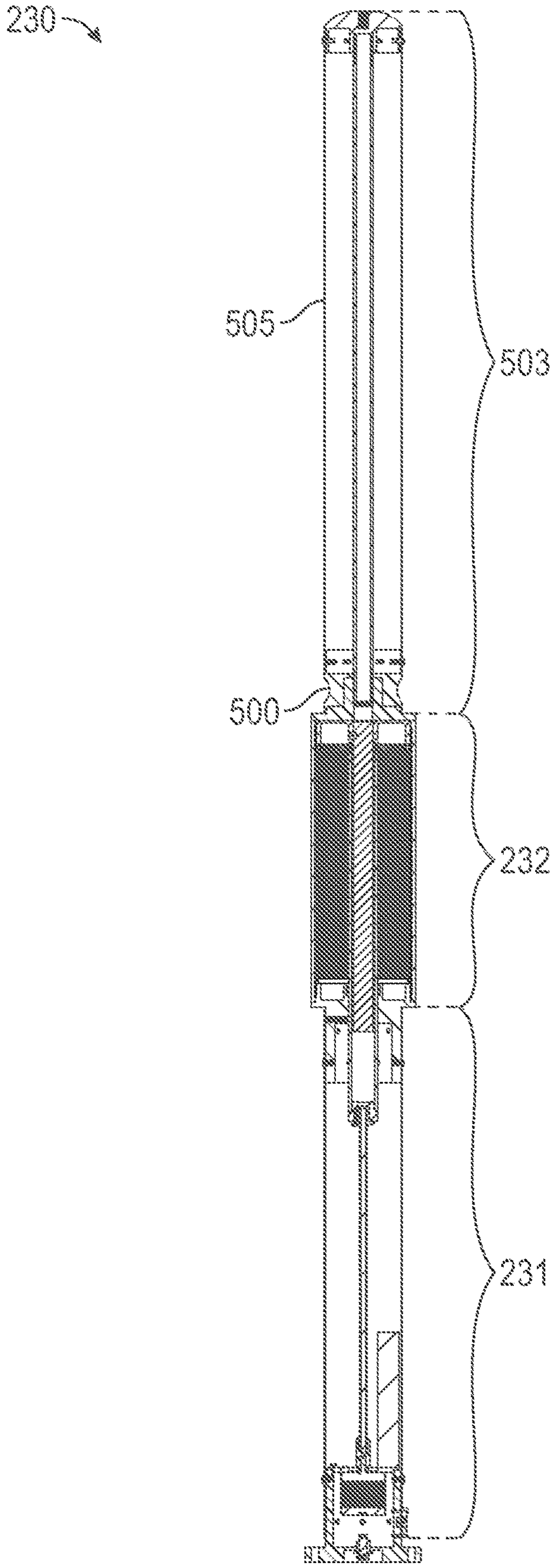
FIG. 2 is an elevated plan view in cross section of an antenna according to an exemplary aspect of the present disclosure.

Referring to FIGS. 1-2, it may be seen that an exemplary embodiment of a ruggedized rapid tuning adjustable frequency antenna 230 with a re-entrant capacitive hat according to the present disclosure may include a metal mast or base assembly 231 at a lower section of the antenna 230, a coil assembly 232 coaxially stacked (i.e., end-to-end) on the base assembly 231 and located at a midsection of the antenna 230, and a re-entrant capacitive hat assembly 503 coaxially stacked on the coil assembly 232 at an upper section of the antenna 230. In an embodiment, the antenna 230 may be cylindrical in overall shape. In an embodiment, each of the base assembly 231, the coil assembly 232, and the re-entrant capacitive hat assembly 503 may be elongated and cylindrical in shape.

Figure 3:
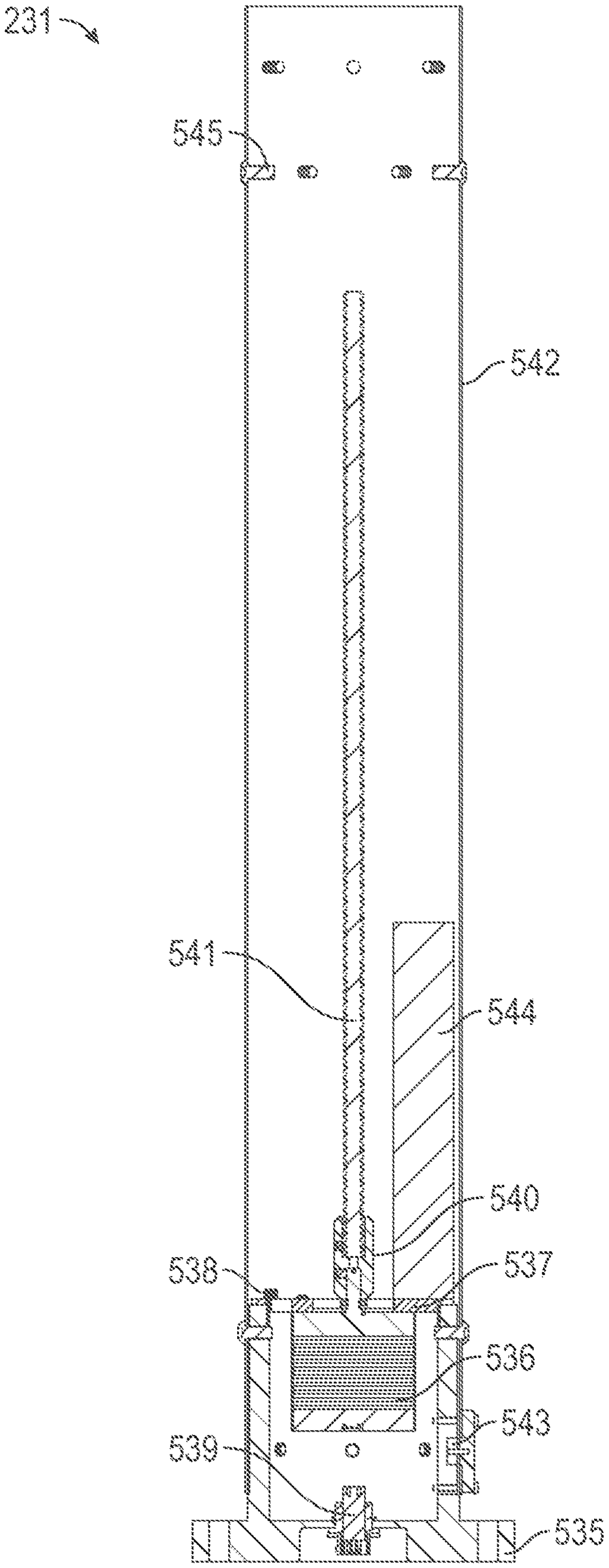
FIG. 3 is a cross-sectional view of a base assembly of an antenna according to an exemplary aspect of the present disclosure.

In FIG. 3, according to an exemplary embodiment, the mast or base assembly 231 may be electrically connected in series to and mechanically engaged with to the variable inductance loading coil assembly 232. In an embodiment, the base assembly 231 may support coaxially at the upper end thereof the axially aligned, cylindrically shaped loading coil assembly 232. In an embodiment, the elongated base assembly 231 may include a support base 535 at a lower end thereof. A mounting plate 537 may be affixed to the support base 535 (such as by one or more screws 538) to thereby enclose a space within the support base 535. A fiber optic cable port 543 may provide access to the fiber optic data cables contained within the base assembly 231.

In an embodiment, the base assembly 231 may further include a motor 536 (such as a stepper motor) that may be in the enclosed space of the support base 535. An electrical connector 539 (such as a pin connector) may be in the enclosed space of the support base 535 and may be used to power and/or drive the motor 536 and provide programing and data connection to a rapid tuning module 544 described below. A coupler 540 may couple the motor 536 to a lead screw 541 that extends longitudinally within a cylindrical, elongated, electrically conductive base housing 542. In an embodiment, the base housing 542 may be made of aluminum. One end (i.e., lower end) of the lead screw 541 may be fixedly attached to the coupler 540. An opposite end (i.e., upper end) of the lead screw 541 may be operatively engaged with, coupled to, and mechanically connected to the coil assembly 232, as further described below.

In an embodiment, the base assembly 231 may further include a hardware and/or software rapid tuning module 544 (frequency hopping and auto tuning modes such as Automatic Link Establishment (ALE) and HF messaging/chat modes) that may be supported by the mounting plate 537 and be within the base housing 542. One or more screws 545 may be at an upper end of the base housing 542 and enable attachment of the housing 542 to the coil assembly 232, as further described below.

In an exemplary embodiment, the base assembly 231 may have a diameter of about 4 inches and a longitudinal length of about 33 inches. In embodiments, the base assembly 231 may have a diameter of 2 to 4 inches and a longitudinal length of about 16 to 36 inches.

In another embodiment, the base assembly 231 may be the same as or similar to the mast section described in U.S. Pat. No. 9,065,178.

Figure 4:
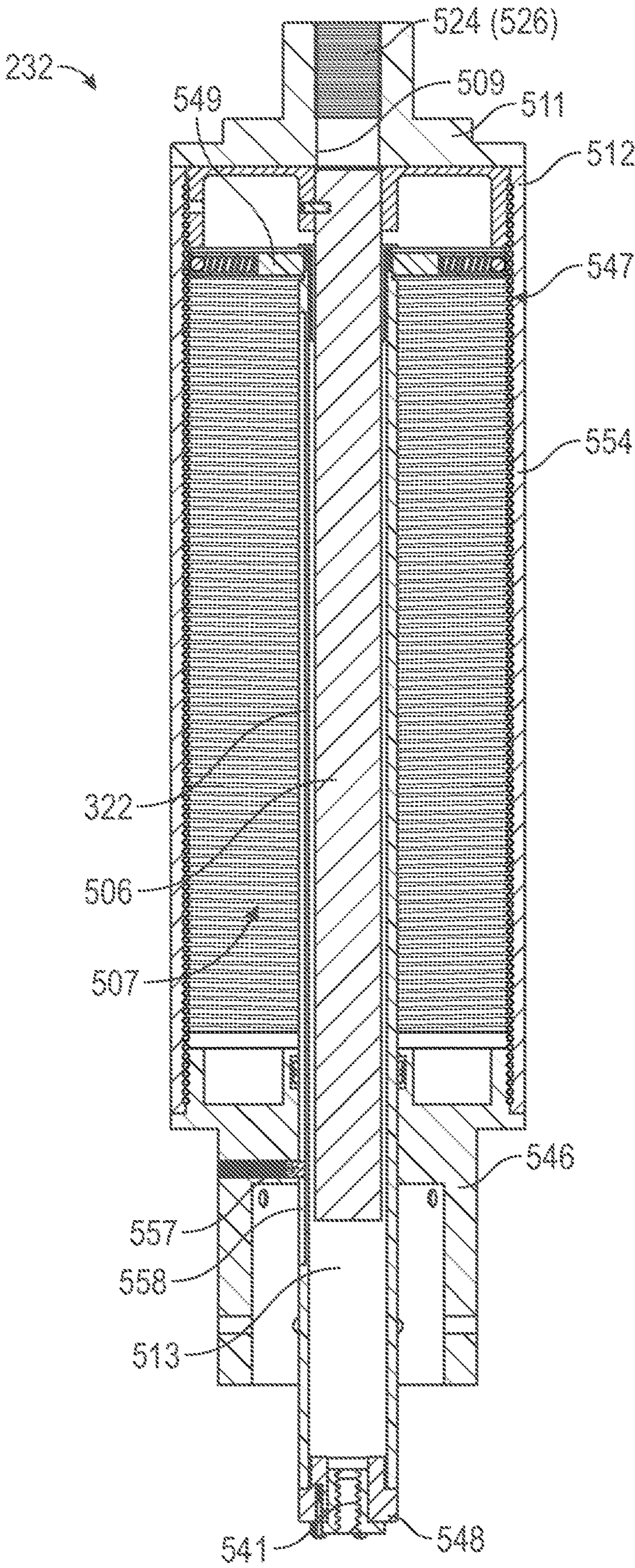
FIG. 4 is a cross-sectional view of a coil assembly of an antenna according to an exemplary aspect of the present disclosure.
Figure 6:
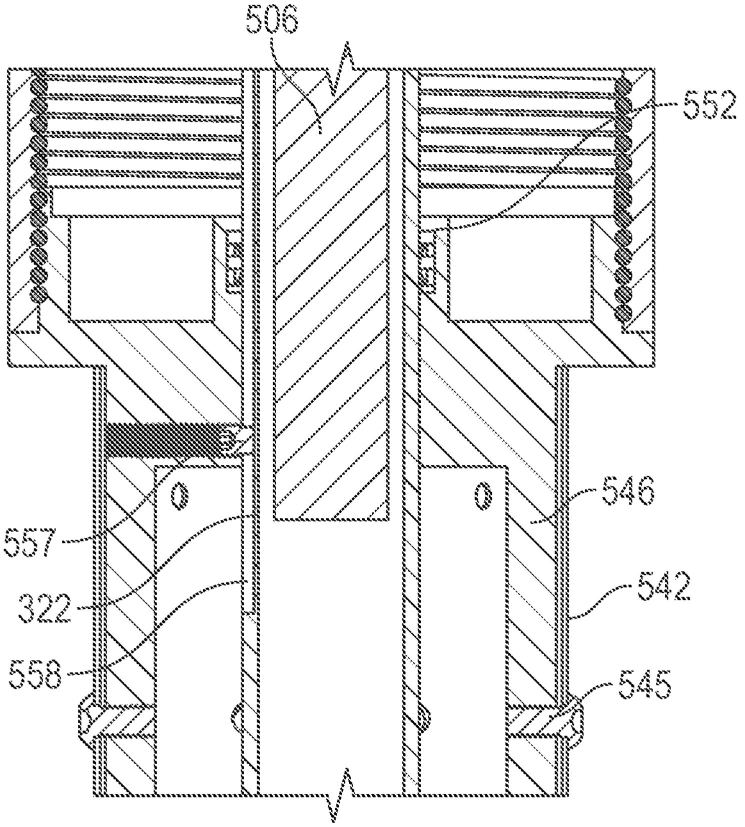
FIG. 6 is a partial, enlarged, cross-sectional view of an interfacing area between a base assembly and a coil assembly of FIGS. 3 and 4.

Referring to FIGS. 4 and 6, in an exemplary embodiment, it may be seen that the loading coil assembly 232 of the rugged antenna 230 can have a construction which differs from the loading coil assembly 32 of the antenna 30 disclosed in U.S. Pat. No. 9,065,178. In other embodiments, the coil assembly 232 may have a construction that is the same as or similar to the coil assembly in U.S. Pat. No. 9,065,178.

In FIG. 4, according to an embodiment, the coil assembly 232 may be configured to provide variable inductance in the antenna 230. The elongated, cylindrical coil assembly 232 may include a coil housing 554. The coil housing 554 may be cylindrically shaped, as an example. The coil housing 554 may be made of a high dielectric material, such as plastic. A lower end of the coil housing 554 may be supported by and/or affixed to a coil base 546 of the coil assembly 232, as further described below. An upper end of the coil housing 554 may be supported by and/or affixed to a coil cap 511, as further described below.

In an embodiment, the coil assembly 232 may further include an electrically conductive, elongated, cylindrical helical coil windings 547. The coil windings 547 may be inside the coil housing 554, in an embodiment. The coil windings 547 may extend from an upper end of the coil housing 554 and to the lower end of the coil housing 554, in an embodiment. The number of coil windings 547 may be from about 56 to about 220, in embodiments.

The coil assembly 232 may include, at a bottom end thereof, the coil base 546, in an embodiment. The coil base 546 may be made of an electrically conductive material, such as aluminum. The coil base 546 may be configured, such as at an upper end section thereof, to fit inside the lower end of the coil windings 547 and/or base housing 542 of the base assembly 231, according to an embodiment. Thereby, the coil base 546 may be in conductive contact with the coil windings 547, in an embodiment. The coil base 546, at a bottom end section thereof, may be affixed inside of and/or in conductive connection with the upper end of the electrically conductive base housing 542 by one or more of the screws 545 of the base assembly 231 (FIG. 6).

In an embodiment, the coil assembly 232 may include, at an upper end thereof, the coil cap 511. The coil cap 511 may be configured, such as at a lower end section thereof, to fit inside the upper end of the coil windings 547. Thereby, the coil cap 511 may be in conductive contact with the coil windings 547, in an embodiment. The coil cap 511 may also be supported by and/or affixed to the upper end of the coil housing 554, in an embodiment. The coil cap 511 may be made of an electrically conductive material, such as aluminum.

In combination, the coil base 546, the coil windings 547, the coil housing 554, and the coil cap 511 can provide a hollow cylindrical space 507 located within the coil housing 554 longitudinally extending through the loading coil assembly 232, according to an embodiment.

As shown in FIG. 4, according to an embodiment, the loading coil assembly 232 can include an elongated, cylindrical coil contactor disk carrier tube 322 having a longitudinal bore 513 therein. The coil contactor disk carrier tube 322 has a groove 558 machined along the longitudinal axis whereby a set screw 557 inserted radially through the coil base 546 and penetrates the machined groove of the carrier tube, thereby preventing rotation. This function increases position precision and accuracy of the contactor disk balls on coil winding 547. The coil contactor disk carrier tube 322 may extend from an upper end of the coil windings 547, through the lower end of the coil windings 547, into the coil base 546, and out of a bottom area of the coil base 546, in an embodiment. Thereby, the coil contactor disk carrier tube 322 may be disposed in the upper end of the base housing 542 of the base assembly 231, according to an embodiment.

In FIG. 4, in an exemplary embodiment, the coil assembly 232 may include, at a lower end of the coil contactor disk carrier tube 322, a screw adaptor 548. In an embodiment, the screw adaptor 548 may be configured to fixedly hold therein the upper end of the lead screw 541 of the base assembly 231. Thereby, rotational translation of the lead screw 541 can be converted to longitudinal translation of the coil contactor disk carrier tube 322.

According to an embodiment, the coil assembly 232 may include a conductive gasket 552, such as finger stock, at an upper section of the coil base 546. (FIG. 6). The gasket 552 may extend around the circumferential exterior surface of the coil contactor disk carrier tube 322, in an embodiment.

Figure 7:
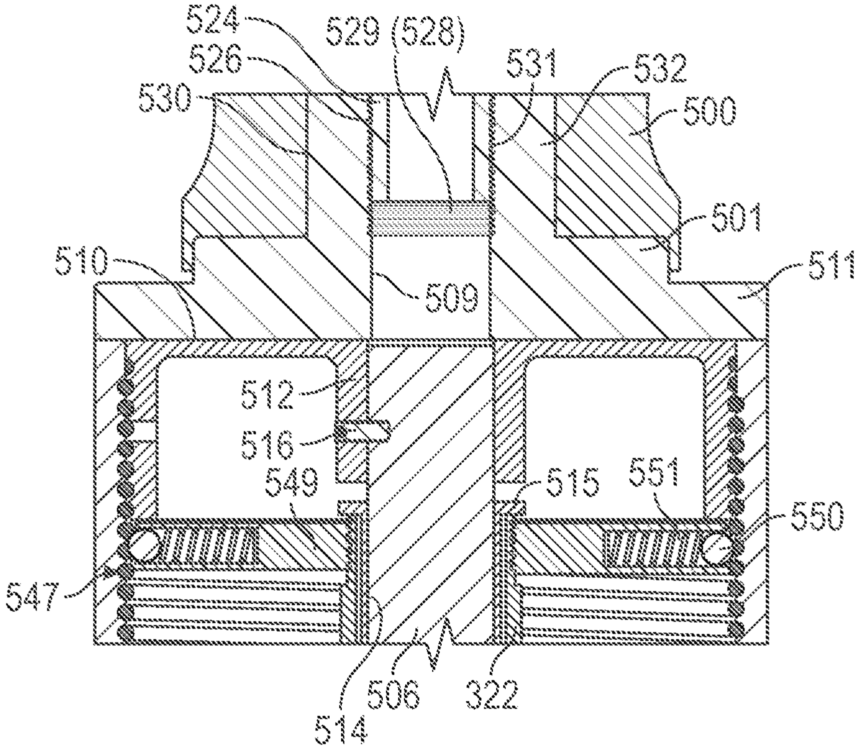
FIG. 7 is a partial, enlarged, cross-sectional view of an interfacing area between a coil assembly and a re-entrant capacitive hat assembly of FIGS. 4 and 5.

In FIGS. 4 and 7, according to an embodiment, the coil assembly 232 may include, about the circumferential exterior of the coil contactor disk carrier tube 322, a connector disk 549. The connector disk 549 may be made of an electrically conductive material, such as aluminum, for example. In an embodiment, the connector disk 549 may be affixed at the upper end of the coil contactor disk carrier tube 322. Thus, longitudinal translation of the coil contactor disk carrier tube 322 may be converted to longitudinal translation of the connector disk 549, according to an embodiment. The connector disk 549, according to an embodiment, may include one or more pairs of an electrically conductive contact ball 550 and an electrically conductive compression spring 551. In an embodiment, the compression spring 551 may bias the contact ball 550 radially outward toward and contact the electrically conductive coil windings 547.

Accordingly, the connector disk 549 may provide variable series inductance from the base assembly 231, the coil assembly 232, and the re-entrant capacitive hat assembly 503. Inductance functioning of a connector disk is described in U.S. Pat. No. 9,065,178.

In FIG. 4, according to an embodiment, the coil assembly 232 may include a stiff, strong, reinforced rod 506 disposed axially through the coil contactor disk carrier tube 322. The rod 506 may extend from an upper end of the coil windings 547 and into the coil base 546. Accordingly, the rod 506 may function to minimize torsional and/or bending movement of the coil contactor disk carrier tube 322 and coil assembly 232. In an exemplary embodiment, the reinforced rod 506 can be an elongated solid circular cross-section rod made of fiberglass, having a diameter of 1 inch and a length of 16 inches.

In FIGS. 4 and 7, an upper end of the reinforced rod 506 can be held in a tight interference fit within a blind bore 509 that may extend upwardly into a lower surface 510 of the upper coil cap 511 that can be fastened to an upper transverse annular edge wall 512 with a set screw 516 that may seal the hollow interior space 507 of the coil assembly 232.

As shown in FIG. 7, in an embodiment, the reinforcement rod 506 may extend coaxially downwardly from the upper end cap 511, and axially through the bore 513 of coil contactor disk carrier tube 322. The reinforcement rod 506 may be fastened to the loading coil assembly 232 solely by the interference fit of the upper end of the reinforcement rod within the bore 509 in the upper cap 511, according to an embodiment. The free lower end of the reinforcement rod 506 may be received downwards into the open upper end of the coil contactor disk carrier tube 322, which may be slidably supported on the reinforcement rod 506 through a bore 514 through the thickness dimension of an annular disk-shaped Teflon sleeve 515 fitted within the bore 513 of the coil contactor disk carrier tube 322, according to an embodiment.

In an exemplary embodiment, the loading coil assembly 232 may have a diameter of about 5.5 inches and a length of about 14 inches. In embodiments, the coil assembly 232 may have a diameter of 2 to 6 inches and a longitudinal length of 8 to 20 inches.

The coil assembly 232 may, in certain embodiments, be constructed the same as or similar to the coil tube section described in U.S. Pat. No. 9,065,178.

Referring to FIGS. 1-2, in an embodiment, it may be seen that the antenna 230 can include a re-entrant capacitive hat assembly 503 that is unlike the whip section in U.S. Pat. No. 9,065,178. In an embodiment, the re-entrant capacitive hat assembly 503 may extend upwardly from an upper side of the insulating spacer bushing 500. The re-entrant capacitive hat assembly 503 may include a cylindrical shell-shaped hat housing 505 made of an electrically conductive material. In an example embodiment of the antenna 230, the hat housing 505 of the re-entrant capacitive hat assembly 503 can be of a circular cross-section aluminum tube having an outer diameter of 4 inches, an inner diameter of 3.9 inches, and a length of 34 inches. In embodiments, the re-entrant capacitive hat assembly 503 may have a diameter of 2 to 6 inches and a longitudinal length of 8 to 48 inches.

Figure 5:
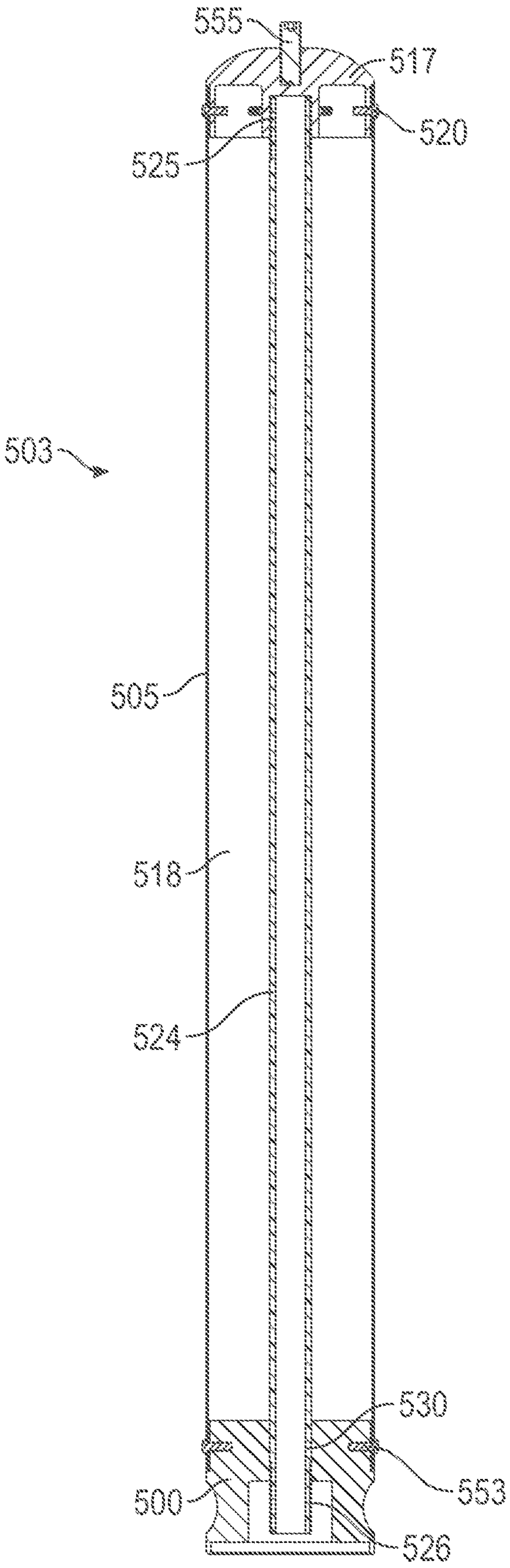
FIG. 5 is a cross-sectional view of a re-entrant capacitive hat assembly of an antenna according to an exemplary aspect of the present disclosure.
Figure 8:
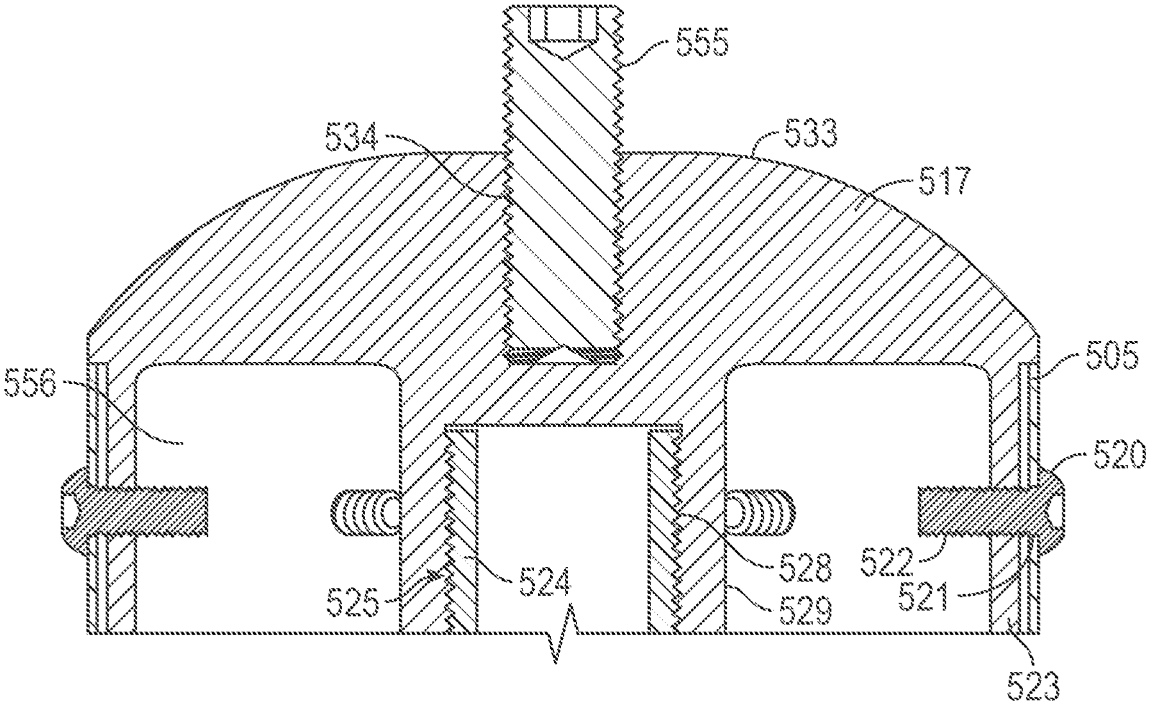
FIG. 8 is a partial, enlarged, cross-sectional view of a re-entrant capacitive hat upper cap plug of FIG. 5.

In FIGS. 2, 5 and 8, according to an embodiment, the re-entrant capacitive hat assembly 503 may include, at an upper end of the hat housing 505, an upper end cap 517. The re-entrant capacitive hat end cap 517 may have a convex, arcuately curved (i.e., dome shaped) upper end face 533, in an embodiment. The upper end cap 517 may be made of an electrically conductive material, such as aluminum. In an embodiment, the upper end cap 517 of the re-entrant capacitive hat assembly 503 may fit conformally within an upper longitudinal end section of a central coaxial bore 518 through the re-entrant capacitive hat housing 505, and may be fastened in conductive contact with the housing 505 by one or a multiplicity of circumferentially spaced-apart screws 520 that are disposed radially through holes 521 in a cylindrical wall of the housing 505, and into bores 522 in a circumferential side wall 523 of the upper end cap 517.

In FIG. 5, the re-entrant capacitive hat assembly 503 may include, at a lower end of and within the hat housing 505, an insulating cylindrically shaped spacer bushing 500 (i.e., a non-electrically conductive spacer) which may operatively interface the coil assembly 232, according to an embodiment. One or more circumferentially disposed screws 553 may affix the hat housing 505 to the bushing 500, according to an embodiment. In an embodiment, the bushing 500 may be configured to prevent electrical conduction between the coil assembly 232 and the bottom end of the re-entrant capacitive hat housing 505, preventing a short between the coil assembly 232 and the re-entrant capacitive hat assembly 503 (i.e., insulating the hat housing 505 from the variable inductance loading coil assembly 232).

As shown in FIG. 7, the spacer bushing 500 may be attached coaxially to an upper side 501 of loading coil assembly 232 and can be axially aligned with the loading coil assembly 232. The spacer bushing 500 can be made of a durable insulating polymer such as Delrin™, and in an example embodiment, can have a diameter of about 4 inches and a thickness of about 2 inches. In embodiments, the spacer bushing 500 may have a diameter of 1.5 to 5.5 inches and a longitudinal length of 1 to 5 inches.

In other embodiments, other spacing/electrically conductive insulating means may be disposed between the coil assembly 232 and the re-entrant capacitive hat assembly 503.

In FIGS. 5 and 8, in an embodiment, the re-entrant capacitive hat assembly 503 may include an elongated support tube 524. In an embodiment, the support tube 524 can structurally support the overall hat assembly 503. In an embodiment, the support tube 524 may be an elongated aluminum tube which has externally threaded upper (525) and lower (526) end sections. In an example embodiment of the antenna 230, the re-entrant capacitive hat support tube 524 may have an outer diameter of 1 inch, an inner diameter of 0.75 inch, and a length of 34 inches. As shown in the figures, the upper end section 525 of the re-entrant capacitive hat support tube 524 may be threaded and received in a threaded bore 528 of a boss 529 of re-entrant capacitive hat end cap 517. A circumferential channel 556 of the support tube 524 may encircle an upper end of the bore 528 and the boss 529.

As shown in FIGS. 4-5 and 7, in an embodiment, a lower end section of the support tube 524 of the re-entrant capacitive hat assembly 503 may extend downwardly through a central coaxial hole 530 through the insulating spacer bushing 500. As shown, the lower threaded end section 526 of the re-entrant capacitive hat support tube 524 may be threaded and secured in a blind threaded bore 531 that is centrally located in an upper side 532 of upper coaxial cap 511 of the loading coil assembly 232.

In FIGS. 5 and 8, the re-entrant capacitive hat upper end cap 517 may be configured to hold a whip extension, in an embodiment. The end cap 517 may optionally include a centrally located threaded bore 534 which extends inwardly into the upper end face 533, for receiving a threaded connector 555 to add an optional short whip extension of the antenna. In an exemplary operating mode of the antenna 230 in which a whip is not used, threaded bore 534 may receive a threaded plug (not shown) which has an arcuately curved outer end face that fits flush with curved outer end face 533.

As can be appreciated by those skilled in the art, the re-entrant capacitive hat assembly 503 provides a novel construction and unexpected result/function. Among other things, enabling the antenna to operate at high efficiency even at frequencies at 1.6 MHz and lower, at which the physical length of the antenna is substantially shorter than λ/4. In an example embodiment of the antenna 230 with re-entrant capacitive hat assembly 503, the antenna was found to have an effective tuning range between 1.6 MHZ to 30 MHZ and above, and usable at frequencies above 150 MHZ.

The invention claimed is:

1. A communication antenna, comprising:

a base assembly at a lower section of the antenna;

a rapid tuning module within the lower section of the antenna and electrically connected to the base assembly;

a variable inductance loading coil assembly, at a midsection of the antenna, and electrically connected to the base assembly;

a re-entrant capacitive hat assembly electrically connected to the variable inductance loading coil assembly, wherein the re-entrant capacitive hat assembly includes:

a hat housing;

a support tube longitudinally extending through the hat housing;

a domed end cap configured to hold, at an end thereof, a whip extension; and a non-electrically conductive spacer insulating the hat housing from the variable inductance loading coil assembly while the support tube is electrically coupled to the variable inductance loading coil assembly.

2. The antenna of claim 1, wherein, the base assembly, the variable inductance loading coil assembly, and the re-entrant capacitive hat assembly can be of various diameters in circumference and are cylindrical in overall shape.

3. The antenna of claim 1, wherein, the base assembly is mechanically and electrically connected to the variable inductance loading coil assembly.

4. The antenna of claim 1, wherein, the coil assembly includes coil windings and a moveable connector disk in contact with the coil windings.

5. The antenna of claim 1, further comprising:

an anti-spin groove along a longitudinal axis of a connector disk carrier tube in the variable inductance loading coil assembly; and a set screw in a coil base of the variable inductance loading coil assembly prevents the connector disk carrier tube from rotating around its longitudinal axis.

6. The antenna of claim 1, further comprising:

the rapid tuning module is within the lower section and electrically connected to the base assembly, and operatively engaged to the variable inductance loading coil assembly, via a lead screw therein, to provide mechanical adjustments to the variable inductance loading coil assembly.

7. The antenna of claim 1, further comprising:

a cable port in the base assembly provides access to data cables contained within the base assembly.

8. The antenna of claim 1, further comprising:

an electrical connector in an enclosed space of a support base in the base assembly and configured to power and/or drive a motor in the base assembly and provide programing and data connection to the rapid tuning module.

9. The antenna of claim 1, wherein, the re-entrant capacitive hat assembly includes the dome end cap on the hat housing.

* * * * *